3,056,774
NEW N-HETEROCYCLIC COMPOUNDS
Henri Dietrich, Birsfelden, near Basel, and Walter Schindler, Riehen, near Basel, Switzerland, assignors to Geigy Chemical Corporation, Ardsley, N.Y., a corporation of Delaware
No Drawing. Filed Dec. 4, 1959, Ser. No. 857,266
Claims priority, application Switzerland Dec. 6, 1958
5 Claims. (Cl. 260—239)

The present invention concerns new N-heterocyclic compounds which are valuable starting materials for the synthesis of pharmaceuticals, as well as a process for the production of these compounds.

3 - substituted 10.11 - dihydro-5H-dibenzo[b.f]azepines and 3-substituted 5H-dibenzo[b.f]azepines of the general formula

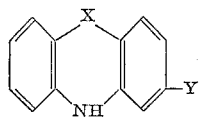

(I)

wherein:

X represents the ethylene or vinylene group

—CH$_2$—CH$_2$— or —CH=CH—, and

Y represents chlorine or bromine, as well as N-derivatives thereof have not been known up to now. It has now been found that such compounds, which will be termed in the following as 3-substituted iminodibenzyls or iminostilbenes, are produced by reacting a 5-acyl iminodibenzyl in the presence of a Friedel-Crafts condensing agent with an acetyl halide or with acetic anhydride, converting the 3-acetyl-5-acyl iminodibenzyl obtained by means of hydrazoic acid according to Schmidt into a 3-acetamido-5-acyl iminodibenzyl, partially hydrolysing the latter to 3-amino-5-acyl iminodibenzyl, converting this into the diazonium chloride or bromide or another diazonium salt, in particular into the sulphate, reacting the diazonium salt with the corresponding cuprous halide according to Sandmeyer, hydrolysing the reaction product to an iminodibenzyl derivative of the general formula

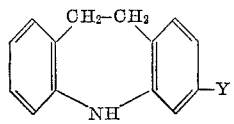

(II)

wherein Y has the meaning given above, or treating the reaction product with halogen or an agent giving off halogen, treating the 3-substituted 5-acyl-10-halogen iminodibenzyl formed with an agent splitting off hydrogen halide, and hydrolysing the 3-substituted 5-acyl iminostilbene obtained to an iminostilbene derivative of the general formula

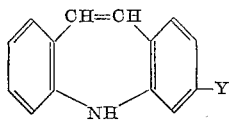

(III)

wherein Y has the meaning given above, if desired the hydrolysis being performed at the same time as the hydrogen halide is split off.

5-acetyl iminodibenzyl which is easily obtained, for example, by refluxing iminodibenzyl with acetyl chloride, is particularly suitable as 5-acyl compound of iminodibenzyl.

Apart from aluminium chloride, also for example bor-trifluoride, aluminium bromide and ferric chloride are used as Friedel-Crafts condensing agents and, as solvents or diluents, for example, carbon disulphide, nitrobenzene or chlorobenzene can be used. The 3-acetyl-5-acyl iminodibenzyls can be converted into the 3-acetamido-5-acyl iminodibenzyls for example, in concentrated sulphuric acid to which an alkali azide is added in portions in the cold and afterwards the whole is heated. The following partial hydrolysis is performed advantageously in an acid medium. If desired, the acid solutions of 3-amino-5-acyl iminodibenzyls, in particular a hydrochloric or hydrobromic acid solution of 3-amino-5-acetyl iminodibenzyl formed in the partial hydrolysis can be used direct for the production of the diazonium salts and the subsequent Sandmeyer reaction.

If 3-substituted iminostilbenes are desired as end products, instead of hydrolysing the 3-substituted 5-acyl iminodibenzyls obtained by the Sandmeyer reaction to 3-substituted iminodibenzyls, they can be treated in particular with N-bromosuccinimide or also with 1.3-dibromo-5.5-dimethyl hydantoin, N-chlorosuccinimide, N-bromophthalimide or N-bromoacetamide as agents giving off halogen. The splitting off of hydrogen halide and the hydrolysis can be performed, for example, in one step by means of alkali lye in the warm. On treating 3-substituted 5-acyl-10-halogen iminodibenzyls with a tertiary organic base such as, e.g. collidine, in the warm, or on treating with an alkali lye in the cold, the 3-substituted 5-acyl iminostilbenes are obtained the hydrolysis of which can also be performed with alkali lye in the warm.

In addition, compounds of the general Formula I in which X is the ethylene group are also obtained by reacting compounds of the general formula

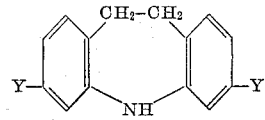

(IV)

wherein Y has the meaning given above, with hydrogen. This reaction is performed under increased pressure in the presence of a hydrogenating catalyst and a substantially equimolar amount of an inorganic or organic base. In particular Raney nickel is suitable as catalyst; also noble metal catalysts can be used. The hydrogen pressure is advantageously between 30 and 80 atmospheres at reaction temperatures of about 20–50° C. Suitable bases are, in particular alkali metal hydroxides which, for example, dissolved in methanol or ethanol, can be added to the solution of the starting materials. Also methanol and ethanol as well as, for example, methoxyethanol are suitable solvents for the starting materials, but the volume of solvent can be considerably reduced if dioxan is used instead as the starting materials dissolve much better in this solvent. Dehalogenation is stopped after nearly one mol of hydrogen has been consumed.

3.7-dichloroiminodibenzyl and 3.7-dibromoiminodibenzyl are starting materials of the general Formula IV. The former can be obtained from 2.2'-diamino-4.4'-dichloroiminodibenzyl by the process described in British Patent No. 777,546, U.S. Patent No. 2,800,470, French Patent No. 1,167,669 and German Patent No. 1,000,820, and the latter compound can be produced in an analogous manner.

The 3-substituted iminodibenzyls and iminostilbenes produced according to the invention can be substituted in many ways in their imino group. For example, compounds having valuable spasmolytic, anticonvulsive, sedative, anti-allergic and psychotherapeutical properties such as 5-(γ-dimethylaminopropyl)-3-chloroiminodibenzyl and 5-(γ-dimethylaminopropyl)-3-chloroiminostilbene are obtained if 3-halogen iminodibenzyls or 3-halogen iminostilbenes respectively are reacted in the presence of sodium amide or lithium amide with dialkylaminoalkyl halides, e.g. γ-dimethylaminopropyl halides or with similar basic halogen compounds. Also, other compounds having valuable therapeutical properties can be produced starting from 3-amino-5-acyl iminodibenzyl which is obtained in the course of the reaction according to the invention.

The following examples further illustrate the production of the new compounds. Parts are given therein as parts by weight and their relationship to parts by volume is as that of grammes to cubic centimetres. The temperatures are in degrees centigrade.

Example 1

(a) A solution of 119 parts of 5-acetyl iminodibenzyl (M.P. 95–96°) and 150 parts of acetyl chloride in 300 parts by volume of carbon disulphide is added dropwise while stirring to a mixture of 300 parts of aluminium chloride and 600 parts by volume of carbon disulphide. The reaction is stirred for 1 hour at room temperature and then is refluxed for 16 hours. It is then cooled and the supernatant carbon disulphide is poured off. The remaining content of the flask is carefully poured while stirring into a mixture of 600 parts of ice and 12 parts by volume of concentrated hydrochloric acid. The crystals which separate are filtered off under suction, thoroughly washed with water, dried and recrystallised. The 3.5-diacetyl iminodibenzyl obtained melts at 143–144°.

(b) 28 parts of 3.5-diacetyl iminodibenzyl are dissolved in 120 parts by volume of concentrated sulphuric acid and 120 parts by volume of chloroform are added. The solution is cooled to 5° and at this temperature 7.2 parts of sodium azide are added in portions while rapidly stirring the solution. Strong foaming occurs as nitrogen develops. On completion of the reaction, the mixture is slowly heated to 60° and kept for 1 hour at this temperature. After cooling, the chloroform is removed from the green to blue coloured sulphuric acid phase which is then poured onto ice while stirring. The crude product precipitates in resinous form. It is thoroughly washed with water, and then triturated with a little methanol whereupon the 3-acetamido-5-acetyl iminodibenzyl crystallises. After recrystallisation from methanol it melts at 220–221°.

(c) 29.4 parts of acetamido-5-acetyliminodibenzyl are suspended in 500 parts by volume of 2 N-hydrochloric acid and the suspension is refluxed until a clear solution is obtained (about 1–2 hours). The yellow-green solution is cooled and, if desired, the amine is precipitated by neutralising with caustic soda lye, the crystals are filtered off and washed with a little water. The crude product is recrystallised from benzene and pure 3-amino-5-acetyl iminodibenzyl (M.P. 149–150°) is obtained which, for example, can be converted into 3-bromo-5-acetyl iminodibenzyl according to Example 2.

(d) The yellow-green solution of the crude hydrolysis product obtained according to (c) above is diazotised at 0–5° with 7 parts of sodium nitrite and the diazonium chloride solution formed is added dropwise to an 80° hot solution of 2 parts of cuprous chloride in 50 parts by volume of concentrated hydrochloric acid. On completion of the nitrogen development, the reaction mixture is cooled and the resinous precipitate is filtered off under suction. On recrystallising it from methanol or ethanol, pure 3-chloro-5-acetyl iminodibenzyl (M.P. 126°) is obtained.

(e) 20 parts of potassium hydroxide are dissolved in 150 parts by volume of methanol, 27.1 parts of 3-chloro-5-acetyl iminodibenzyl are added and the whole is refluxed for 6 hours in a nitrogen atmosphere. The solution is then concentrated almost to dryness and then water is added. The crude product is taken up in ether, decoloured with a little animal charcoal and then evaporated to dryness. Recrystallised from benzine, the 3-chloroiminodibenzyl melts at 87–89°.

3-chloroiminodibenzyl can also be obtained if, in the above example, 5-propionyl iminodibenzyl is reacted with acetic anhydride in the presence of ferric chloride instead of the 5-acetyl iminodibenzyl being reacted with acetyl chloride in the presence of aluminium chloride.

Example 2

25.2 parts of 3-amino-5-acetyl iminodibenzyl are dissolved in 50 parts by volume of 48% hydrobromic acid and 200 parts by volume of ice water. The cooled solution (0–5°) is diazotised with 7 parts of sodium nitrite and the diazo solution is added dropwise while stirring to 5 parts of cuprous bromide in 80 parts by volume of hot (80°) 48% hydrobromic acid.

The copper complex begins to precipitate immediately. After completion of the dropwise addition, the reaction mixture is stirred at 80° until no more nitrogen is developed. The precipitate is then filtered off under suction, washed with water and then purified by recrystallisation (and removal of cuprous bromide). The pure 3-bromo-5-acetyl iminodibenzyl melts at 141–143° and can be hydroylsed analogously to Example 1(e) to 3-bromoiminodibenzyl.

Example 3

27.1 parts of 3-chloro-5-acetyl iminodibenzyl are dissolved in 300 parts by volume of carbon tetrachloride, the solution is heated to 60° and 20 parts of finely pulverised N-bromosuccinimide are added. The mixture is vigorously stirred. The bromination is completed after about 3 hours while irradiating with a UV lamp at a constant 60°. (On interrupting the stirring, no more bromosuccinimide gathers on the floor of the vessel but the lighter, flocculent succinimide floats on the surface of the solution.) The reaction mixture is cooled immediately, the succinimide is filtered off and washed with carbon tetrachloride. The solvent is evaporated off in the vacuum at most 50°, whereupon the bromination product is obtained as a white, foamy resin. If desired, to obtain the pure substance, ether can be added to the resin whereupon the white bromination product crystallises and can be filtered off under suction from the yellow ether solution. After recrystallisation from ethanol, the pure product melts at 135–136.5°.

The crude bromination product is dissolved in 70 parts by volume of ethanol and 13 parts of 50% potassium lye are added while stirring. Potassium bromide separates immediately. The temperature should not exceed 60°. After standing for 30 minutes, water is added to the reaction mixture, it is cooled with ice whereupon the oil which precipitates slowly crystallises. The crystals are filtered off under suction and washed with petroleum ether. The crude 3-chloro-5-acetyl iminostilbene can be converted without purification into 3-chloroiminostilbene by refluxing it with 150 parts by volume of 10% ethanolic potassium lye for 4 hours. On cooling, the yellow 3-chloroiminostilbene crystallises. Recrystallised from alcohol it melts at 213–214°.

Starting from the 3-bromo-5-acetyl iminodibenzyl described in example 2, 3-bromoiminostilbene (M.P. 217.5–218.5°) is obtained in an analogous manner.

The same iminostilbene derivatives are obtained if, in the above example, 1.3-dibromo-5.5-dimethyl hydantoin is used instead of N-bromosuccinimide.

Example 4

264 parts of 3.7-dichloroiminodibenzyl are dissolved in 600 parts by volume of dioxan and 60 parts by volume of methanol which solvent mixture contains 56 parts of potassium hydroxide. After the addition of 75 parts of Raney nickel, hydrogenation is performed at 35–45° and 50 atm., until the take-up of hydrogen corresponds to nearly 100%. After filtering off the catalyst, the solution is evaporated to dryness. After removal of the potassium chloride with water and drying, the crude product is purified by fractionated distillation in a high vacuum or by the zonal melting technique. Non-reacted dichloroiminodibenzyl as well as iminodibenzyl can be separated in this way from the desired 3-chloroiminodibenzyl. The pure product melts, after recrystallisation from benzine, at 87–89°.

3-bromoiminodibenzyl can be obtained in an analogous manner from 3.7-dibromoiminodibenzyl.

What we claim is:
1. 3-amino-5-lower alkanoyl iminodibenzyl.
2. 3-amino-5-acetyl iminodibenzyl.
3. 3-halogen-5-lower alkanoyl iminodibenzyl.
4. 3-chloro-5-acetyl iminodibenzyl.
5. 3-bromo-5-acetyl iminodibenzyl.

References Cited in the file of this patent
FOREIGN PATENTS

| | | |
|---|---|---|
| 200,579 | Austria | Nov. 10, 1958 |
| 215,335 | Australia | June 11, 1958 |